United States Patent
Shih et al.

(10) Patent No.: US 9,733,418 B2
(45) Date of Patent: Aug. 15, 2017

(54) LIGHT SOURCE MODULE AND DISPLAY DEVICE

(71) Applicant: E Ink Holdings Inc., Hsinchu (TW)

(72) Inventors: Yao-Tsung Shih, Hsinchu (TW); Mei-Chen Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 334 days.

(21) Appl. No.: 14/555,714

(22) Filed: Nov. 28, 2014

(65) Prior Publication Data

US 2015/0226898 A1 Aug. 13, 2015

(30) Foreign Application Priority Data

Feb. 10, 2014 (TW) .............................. 103104283 A

(51) Int. Cl.
 *F21V 8/00* (2006.01)
(52) U.S. Cl.
 CPC ........... *G02B 6/0068* (2013.01); *G02B 6/005* (2013.01); *G02B 6/0055* (2013.01)
(58) Field of Classification Search
 CPC ..... G02B 6/002; G02B 6/0068; G02B 6/0093
 See application file for complete search history.

(56) References Cited

U.S. PATENT DOCUMENTS

| | | | |
|---|---|---|---|
| 7,072,116 B2 | 7/2006 | Okuwaki et al. | |
| 7,217,375 B2 | 5/2007 | Lai | |
| 8,033,706 B1* | 10/2011 | Kelly | G02B 6/0036 362/307 |
| 2006/0126142 A1* | 6/2006 | Choi | G02B 6/0018 359/15 |
| 2006/0245061 A1* | 11/2006 | Choi | G02B 6/0038 359/618 |
| 2008/0002428 A1* | 1/2008 | Byun | G02B 6/0016 362/608 |
| 2009/0040428 A1* | 2/2009 | Shimura | G02B 6/005 349/65 |
| 2009/0154198 A1* | 6/2009 | Lee | G02B 6/0081 362/624 |

(Continued)

FOREIGN PATENT DOCUMENTS

CN 101210976 A 7/2008

OTHER PUBLICATIONS

"Office Action of China Counterpart Application", issued on Sep. 5, 2016, p. 1-p. 8.

*Primary Examiner* — Elmito Breval
(74) *Attorney, Agent, or Firm* — Jianq Chyun IP Office

(57) ABSTRACT

A light source module is provided. At least one light-emitting device emits light and is disposed beside the light guide plate. A light guide plate includes a first surface, a second surface being opposite to the first surface and a light-entering surface connecting the first surface with the second surface. At least one first light guide end, which is located in front of the light-emitting device, and at least one second light guide end, which is connected to the first light guide end, are located on a side of the light guide plate where the light-entering surface is located. A first light-transmitting medium at least located at the first light guide end on the first surface has a refractive index which is larger then a refractive index of a medium or space located at the second light guide end on the first surface. A display device is also provided.

27 Claims, 7 Drawing Sheets

(56) References Cited

U.S. PATENT DOCUMENTS

| | | | |
|---|---|---|---|
| 2011/0051043 A1* | 3/2011 | Kim | G02F 1/133308 349/64 |
| 2011/0051412 A1* | 3/2011 | Jeong | G02F 1/133603 362/235 |
| 2011/0096564 A1* | 4/2011 | Shin | G02B 6/0061 362/607 |
| 2011/0187967 A1* | 8/2011 | Shinohara | G02B 6/0016 349/65 |
| 2011/0255305 A1* | 10/2011 | Chen | G02B 6/0035 362/619 |
| 2011/0310332 A1* | 12/2011 | Boyd | G02B 6/0053 349/65 |

\* cited by examiner

LIGHT SOURCE MODULE AND DISPLAY DEVICE

CROSS-REFERENCE TO RELATED APPLICATION

This application claims the priority benefit of Taiwan application serial no. 103104283, filed on Feb. 10, 2014. The entirety of the above-mentioned patent application is hereby incorporated by reference herein and made a part of this specification.

FIELD OF THE INVENTION

The invention is directed to an optical apparatus and an image apparatus, and more particularly to a light source module and a display apparatus.

DESCRIPTION OF RELATED ART

With rapid development of display technologies, light and thin consumer electronics products like multimedia apparatuses, such as mobile phones, tablet computers, televisions etc., become mainstream on the current market. Light and thin display apparatuses are one of the major designs adopted by the multimedia apparatuses, and the display apparatuses that are currently applied to the light and thin designs include, for example, LCD display apparatuses, electrophoretic display apparatuses and so on.

In the designs of the light and thin display apparatuses, how to make light source modules (including frontlight modules or backlight modules) lighter and thinner has become one of the major issues. In a display apparatus, a reflective display panel may be accompanied with a frontlight module. With the trend of the volume of the display apparatuses becoming smaller and cost-saving, the light irradiating on a display panel through the light guide plate or the light emitting from the light guide plate will have insufficient uniformity during the illumination of the light emitting devices, due to the position distribution of light emitting devices (e.g., light emitting diodes, LEDs). As a result, hot spots appear in portions of the light guide plate which are located in front of the light emitting devices and adjacent to a light-entering surface, while dark spots are formed between each two hot spots. Moreover, a situation of uneven brightness occurs to an image displayed in an active area of a conventional display apparatus, which leads to reduction of image quality. Accordingly, a light source module capable of providing a uniform light source and a display apparatus achieving an effect of uniformly emitting light are demanded.

SUMMARY

The invention is directed to a light source module capable of providing surface light source with high uniformity.

The invention is directed to a display apparatus capable of providing good images and improving uniformity of image brightness.

According to an embodiment of the invention, a light source module is provided. The light source module includes at least one light emitting device, a light guide plate, at least one first light guide end, at least one second light guide end and a first light-transmitting medium. The light-emitting device is adapted to emit at least one light beam and disposed beside the light guide plate. The light guide plate includes a first surface, a second surface and a light-entering surface. The second surface is opposite to the first surface, and the light-entering surface is connected with the first surface and the second surface. The first light guide ends is located on a side of the light guide plate where the light-entering surface is located and located in front of the light-emitting device, and the second light guide end is located on a side of the light guide plate where the light-entering surface is located and connected to the first light guide end. The first light-transmitting medium is disposed at the first light guide end on the first surface and has a refractive index greater than a refractive index of a medium or space located at the second light guide end on the first surface.

According to an embodiment of the invention, a display apparatus is provided. The display apparatus includes a display panel and a light source module. The light source module is disposed on the display panel. The light source module includes at least one light emitting device, a light guide plate, at least one first light guide end, at least one second light guide end and a first light-transmitting medium. The light-emitting device is adapted to emit at least one light beam and disposed beside the light guide plate. The light guide plate includes a first surface, a second surface and a light-entering surface. The second surface is opposite to the first surface, and the light-entering surface is connected with the first surface and the second surface. One of the first surface and the second surface faces toward the display panel, and the other of the first surface and the second surface faces the display panel with the back. The first light guide ends is located on a side of the light guide plate where the light-entering surface is located and located in front of the light-emitting device, and the second light guide end is located on a side of the light guide plate where the light-entering surface is located and connected to the first light guide end. The first light-transmitting medium is at least disposed at the first light guide end on the first surface. A refractive index of the first light-transmitting medium is greater than a refractive index of a medium or space located at the second light guide end on the first surface.

In an embodiment, the at least one light emitting device is a plurality of light emitting devices, the at least one first light guide end is a plurality of first light guide ends, and the first light guide ends and the second light guide ends are arranged alternately along the light-entering surface.

In an embodiment of the invention, the light source module further includes a second light-transmitting medium. The second light-transmitting medium is a medium located at the second light guide end on the first surface and connected with the first light-transmitting medium.

In an embodiment of the invention, the second light-transmitting medium is a light-transmitting adhesive layer.

In an embodiment of the invention, the medium located at the second light guide end on the first surface is air, gas or liquid.

In an embodiment of the invention, the light guide plate has an active area. The distance between an edge of the active area, which is adjacent to the light-entering surface, and the light emitting device is 0 to 0.5 mm along a direction parallel to the first surface.

In an embodiment of the invention, the light source module further includes a protection cover plate disposed on the first surface or the second surface.

In an embodiment of the invention, the display apparatus further includes a protection cover plate, and the light guide plate is disposed between the protection cover plate and the display panel.

In an embodiment of the invention, the light source module further includes a third light-transmitting medium. The third light-transmitting medium is at least disposed at the first light guide end on the second surface. A refractive index of the third light-transmitting medium is greater than a refractive index of a medium or a space located at the second light guide end on the second surface.

In an embodiment of the invention, the third light-transmitting medium is further disposed in a region located outside the first light guide end and the second light guide end on the second surface.

In an embodiment of the invention, the light source module further includes a fourth light-transmitting medium. The fourth light-transmitting medium is a medium located at the second light guide end on the second surface and connected with the third light-transmitting medium.

In an embodiment of the invention, the first light-transmitting medium is a light-transmitting adhesive layer.

In an embodiment of the invention, the first light-transmitting medium is further disposed in a region located outside the first light guide end and the second light guide end on the first surface.

In an embodiment of the invention, the display panel is a reflective display panel.

In an embodiment of the invention, a refractive index of the first light-transmitting medium is less than a refractive index of the light guide plate.

Based on the above, in the light source module of the embodiment of the invention, the surface media of the first and the second light guide ends are designed to have different refractive indexes, and thereby, hot spots and dark spots formed in the conventional light source module can be eliminated so as to improve uniformity of light illumination. Moreover, according the embodiments of the invention, the display apparatus having the light source module can provide good image quality by means of the uniform light illumination.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
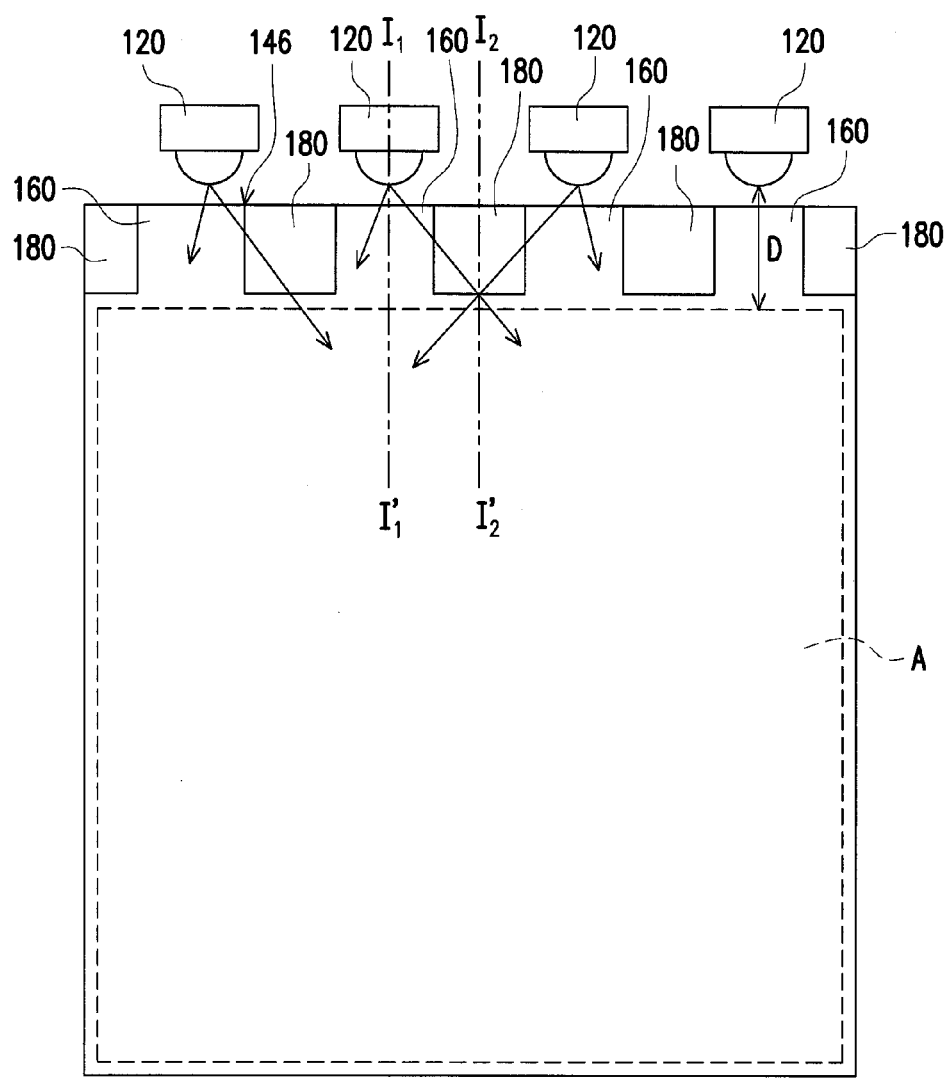
FIG. 1 is a top view of a light source module according to a first embodiment of the invention.
Figure 2A:
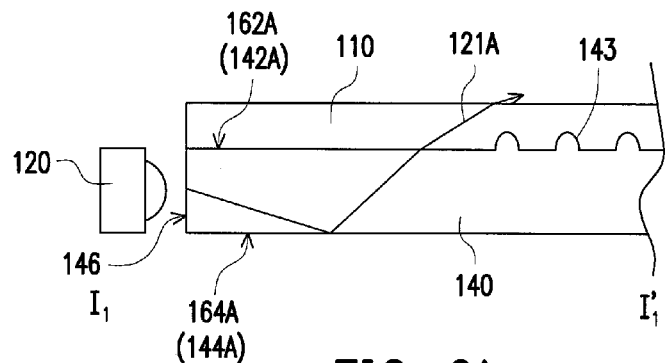
FIG. 2A is a cross-sectional view based on a section line $I_1I_1'$ of FIG. 1.
Figure 2B:
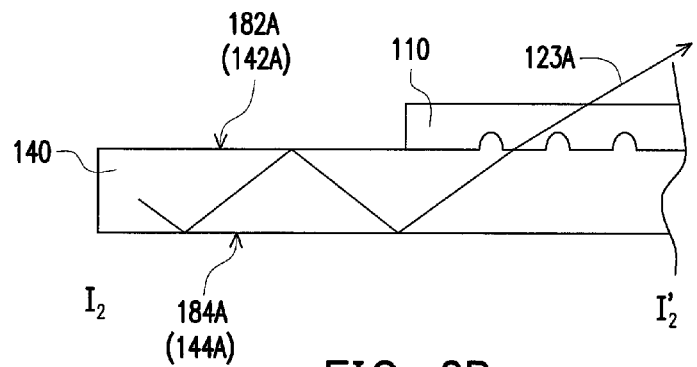
FIG. 2B is a cross-sectional view based on a section line $I_2I_2'$ of FIG. 1.
Figure 3:
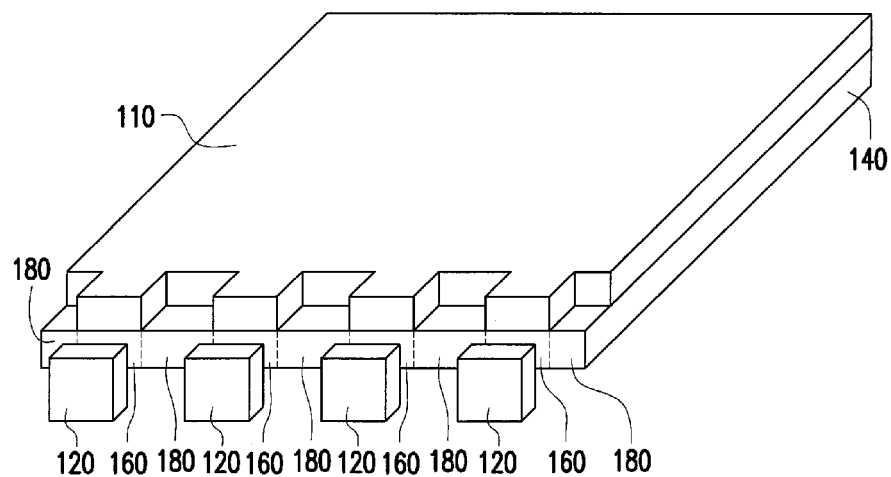
FIG. 3 is a perspective view of the light source module of FIG. 1.

FIG. 1 is a top view of a light source module according to a first embodiment of the invention. FIG. 2A is a cross-sectional view based on a section line $I_1I_1'$ of FIG. 1. FIG. 2B is a cross-sectional view based on a section line $I_2I_2'$ of FIG. 1, and FIG. 3 is a perspective view of the light source module of FIG. 1. Referring to FIG. 1, FIG. 2A and FIG. 2B, a light source module 100 of the present embodiment includes at least one light emitting device 120 (which is illustrated as a plurality of light emitting devices 120 herein for example) and a light guide plate 140. The light guide plate 140 has a first surface 142A, a second surface 144A and a light-entering surface 146. At least one first light guide end 160 and at least one second light guide end 180 (which are illustrated as a plurality of first light guide ends 160 and a plurality of second light guide ends 180 herein for example) are alternately arranged at one side of the light guide plate 140 where the light-entering surface 146 is located. It it specially to be mentioned that in the present embodiment, the first light guide ends 160 are disposed in front of the light emitting device 120, while the second light guide ends 180 are connected with the first light guide ends 160. Referring to FIG. 1 and FIG. 3, in the present embodiment, a first light-transmitting medium 110 is disposed at the first light guide ends 160 on the first surface 142A and outside of the first light guide ends 160 and the second light guide ends 180 and has a refractive index greater than a medium (e.g., air) at the second light guide ends 180 on the first surface 142A. Furthermore, the cross-sectional view of FIG. 2A illustrates a cross-sectional structure containing a first light guide end 160 of the present embodiment, and the cross-sectional view of FIG. 2B illustrates a cross-sectional structure containing a second light guide end 180 of the present embodiment. Referring to FIG. 2A, a first surface 162A is a part of the first surface 142A and a second surface 164A is a part of the second surface 144A that correspond to the first light guide end 160, while referring to FIG. 2B, a first surface 182A is a part of the first surface 142A and a second surface 184A is a part of the second surface 144A that correspond to the second light guide end 180. The present embodiment will be described clearly further with reference to the description below.

Referring to FIG. 1, FIG. 2A and FIG. 2B, in the first embodiment of the invention, the light emitting devices 120 are adapted to emit light beams to the light-entering surface 146. The light beams includes, for example, a light beam 121A and a light beam 123A. In the present embodiment, after entering the light guide plate 140, the light beam 121A is reflected by the second surface 164A, and the reflected light beam 121A reaches the first surface 162A where the first light-transmitting medium 110 is disposed. The refractive index of the first light-transmitting medium 110 is greater than the medium (for example, air in this case) on the first surface 182A, which leads the light beam 121A penetrating the first surface 162A more easily. Comparatively, in the present embodiment, after entering the light guide plate 140, the light beam 123A is easily reflected by the second surface 184A and the first surface 182A, and then penetrates the first surface 142A in an active area A. Moreover, in the present embodiment, the disposition of the first light-transmitting medium 110 results in the first surface 162A and the second surface 182A respectively having different reflectance and critical angles. Thereby, the light beam from the first light guide end 160 in front of the light emitting device 120 penetrates the light guide plate 140 more easily before reaching the active area A, and the light beam penetrating the second light guide end 180 is easily reflected to the active area A and then penetrates the light guide plate 140. Thus, in the active area A, a brightness level of a part near the first light guide ends 160 is reduced, while a brightness level of another part near the second light guide ends 180 is increased, such that hot spots, dark spots and affection caused thereby are eliminated and uniformity of the light-emitting of the light source module 100 is enhanced. To be more detailed, referring to FIG. 1, in the present embodiment, a distance D between the light emitting devices 120 and an edge of the active area A which is adjacent to the light-entering surface 146 is 7 to 12 mm, but the invention is not limited thereto.

In the first embodiment of the invention, the light emitting devices 120 are light emitting diodes (LEDs), but the invention is not limited thereto. In other embodiments, the light emitting devices 120 may also be organic light emitting diodes (OLEDs) or other devices suitable for emitting light beams. On the other hand, the first surface 142A of the present embodiment also has a plurality of optical micro-structures, but the invention is not limited thereto. In other embodiments, the optical micro-structures 143 may also be disposed on the first surface 142A or the second surface 144A of the light guide plate 140. The optical micro-structures 143 are suitable for light to penetrate the light guide plate 140 in places corresponding to the active area A. In another embodiment, the optical micro-structures 143 may also be disposed on both the first surface 142A and the second surface 144A of the light guide plate 140.

In the first embodiment of the invention, the medium on the first surface 182A is air, but the invention is not limited thereto. In other embodiments, the medium on the first surface 182A may be other light-transmitting gas, liquid or a solid material with a refractive index less than the refractive index of the first light-transmitting medium 110. Furthermore, the first light-transmitting medium 110 of the present embodiment is a light-transmitting adhesive layer. Furthermore, the refractive index of the first light-transmitting medium 110 is greater than a refractive index of the air and less than a refractive index of the light guide plate 140, but the invention is not limited thereto.

Figure 4:
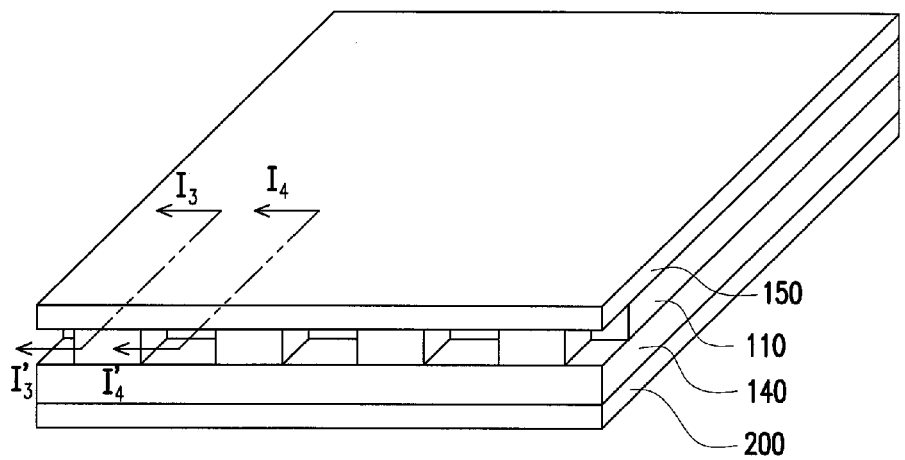
FIG. 4 is a perspective view of a display apparatus according to another embodiment of the invention.
Figure 5A:
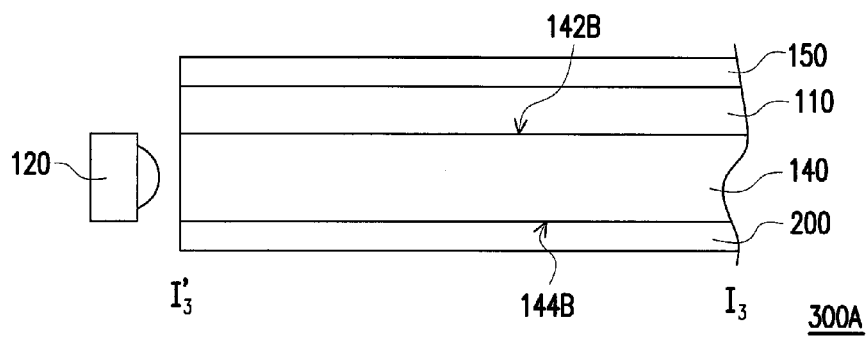
FIG. 5A is a partial cross-sectional view of the display apparatus of FIG. 4 based on a section line $I_3I_3'$.
Figure 5B:
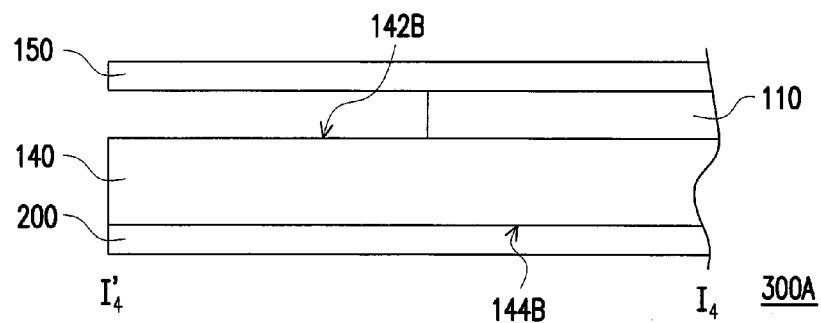
FIG. 5B is a partial cross-sectional view of the display apparatus of FIG. 4 based on a section line $I_4I_4'$.

FIG. 4 is a perspective view of a display apparatus according to another embodiment of the invention. FIG. 5A is a partial cross-sectional view of the display apparatus of FIG. 4 based on a section line $I_3I_3'$. FIG. 5B is a partial cross-sectional view of the display apparatus of FIG. 4 based on a section line $I_4I_4'$. Therein, the light emitting device 120 is omitted in FIG. 4 in order to clearly illustrate the structure of the light guide plate. Referring to FIG. 4, FIG. 5A and FIG. 5B, a display apparatus 300A of the present embodiment has a light source module and a display panel 200. The light source module of the present embodiment is similar to the light source module illustrated in FIG. 1, and the difference is that the light source module of the present embodiment further has a protection cover plate 150 which is disposed on the first light-transmitting medium 110. In the present embodiment, the display panel 200 is located beneath the light guide plate. To be more detailed, in the present embodiment, a second surface 144B faces toward the display panel 200, and the protection cover plate 150 is disposed above a first surface 142B and suitable for protecting the first light-transmitting medium 110. The design and effect of details with respect to the light source module of the present embodiment are the same as the first embodiment, and FIG. 5A may correspond to FIG. 2A and FIG. 5B may correspond to FIG. 2B. That is to say, the cross-sectional view of FIG. 5A illustrates a cross-sectional structure containing a first light guide end of the present embodiment, and the cross-sectional view of FIG. 5B illustrates a cross-sectional structure containing a second light guide end of the present embodiment. Meanwhile, the first light-transmitting medium 110 in the present embodiment is disposed in a manner similar to the first embodiment, and thus, the effect to be achieved thereby and the details thereof will not be repeated hereinafter. Additionally, in the present embodiment, the display panel 200 is, for example, a reflective display panel, but the invention is not limited thereto. In other embodiments of the invention, the display panel 200 may further be a transmissive display panel or transflective display panel. In the present embodiment, the display panel 200 (i.e., the reflective display panel) may provide displayed images in good quality by means of the light source module emitting lights with high uniformity.

Figure 6:
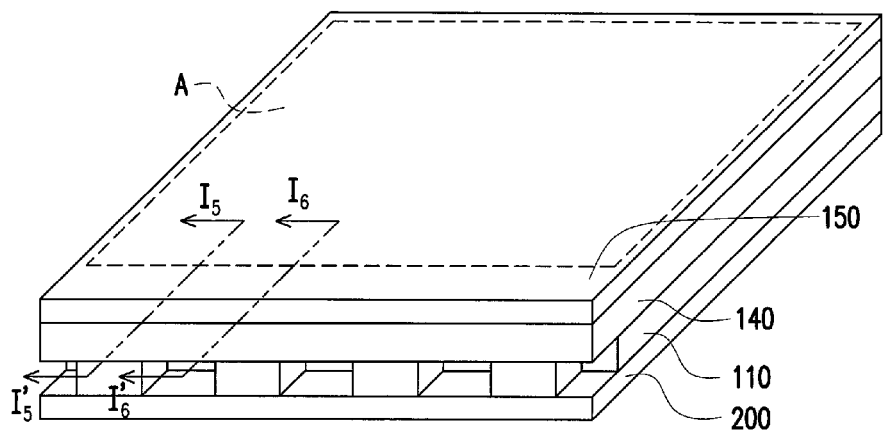
FIG. 6 is a perspective view of a display apparatus according to another embodiment of the invention.
Figure 7A:
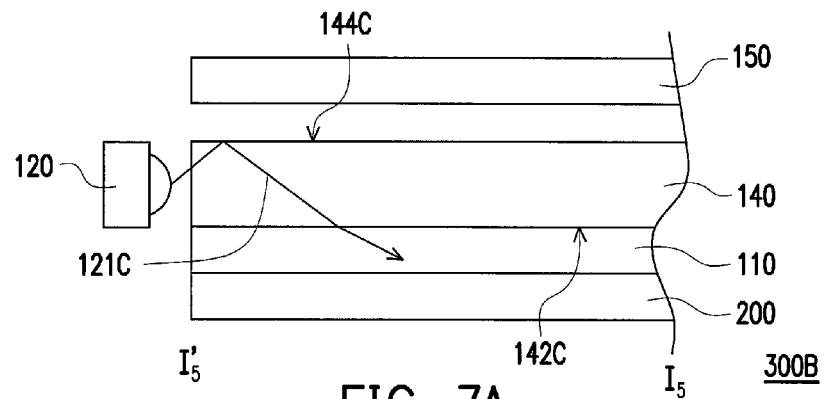
FIG. 7A is a partial cross-sectional view of the display apparatus of FIG. 6 based on a section line $I_5I_5'$.
Figure 7B:
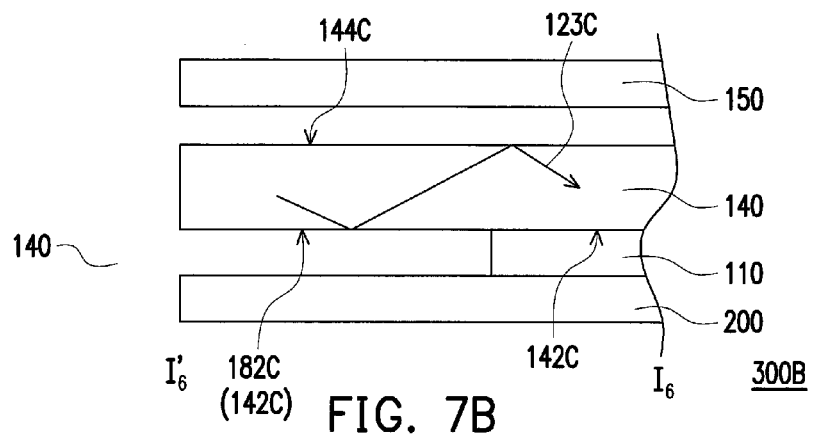
FIG. 7B is a partial cross-sectional view of the display apparatus of FIG. 6 based on a section line $I_6I_6'$.

FIG. 6 is a perspective view of a display apparatus according to another embodiment of the invention. FIG. 7A is a partial cross-sectional view of the display apparatus of FIG. 6 based on a section line $I_5I_5'$. FIG. 7B is a partial cross-sectional view of the display apparatus of FIG. 6 based on a section line $I_6I_6'$. Therein, the light emitting device 120 is omitted in FIG. 6 in order to clearly illustrate the structure of the light guide plate 140, the cross-sectional view of FIG. 7A illustrates a cross-sectional structure containing a first light guide end of the present embodiment, and the cross-sectional view of FIG. 7B illustrates a cross-sectional structure containing a second light guide end of the present embodiment. Referring to FIG. 6, FIG. 7A and FIG. 7B, in the present embodiment, the parts which are similar to those in the first embodiment of the invention are labeled by the same reference numbers, and the disposition of the similar parts will not be repeatedly described hereinafter. The present embodiment is different from the first embodiment in the disposition relationship between a first surface 142C and a second surface 144C of the light guide plate 140. In the present embodiment, the protection cover plate 150 is disposed above the second surface 144C, while the first surface 142C faces toward the display panel 200. In other words, the light guide plate 140 of the present embodiment is disposed between the protection cover plate 150 and the display panel 200, while the first light-transmitting medium 110 is disposed on the first surface 142C, i.e., between the light guide plate 140 and the display panel 200. Referring to FIG. 7A and FIG. 7B, in the present embodiment, a portion of the light beams (e.g., a light beams 121C) emitted by the light emitting devices 120 penetrate the first light guide ends of the light guide plate 140. Due to the disposition of the first light-transmitting medium 110, the light beam 121C entering the light guide plate 140 penetrates the first surface 142C easily. Namely, the light beam 121C entering the light guide plate 140 penetrates the light guide plate 140 easily before entering a part in the light guide plate 140 corresponding to the active area A, so as to reduce the brightness level of the part of the active area A in front of the light emitting devices 120. Additionally, in the present embodiment, a portion of the light beams (e.g., a light beams 123C) emitted by the light emitting devices 120 penetrate the second light guide ends of the light guide plate 140. Without the first light-transmitting medium 110 disposed on the first surface 182C corresponding to the second light guide ends, the light beam 123C is easily reflected to a place on the light guide plate 140 corresponding to the active area A and then penetrates the light guide plate, so as to increase the brightness level of the part of the active area A which is adjacent to the second light guide ends. In other words, in the present embodiment, reflectance and a critical angel of an interface between the display panel 200 and the light guide plate 140 varies with the disposition of the first light-transmitting medium 110, so as to improve uniformity of illumination within the active area and image quality of the display apparatus 300B.

Figure 8A:
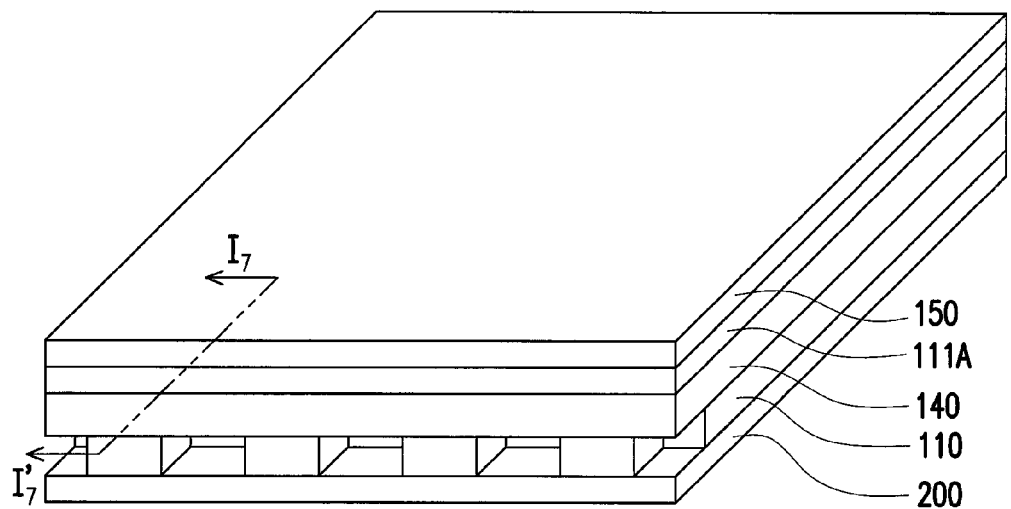
FIG. 8A is a perspective view of a display apparatus according to another embodiment of the invention.
Figure 8B:
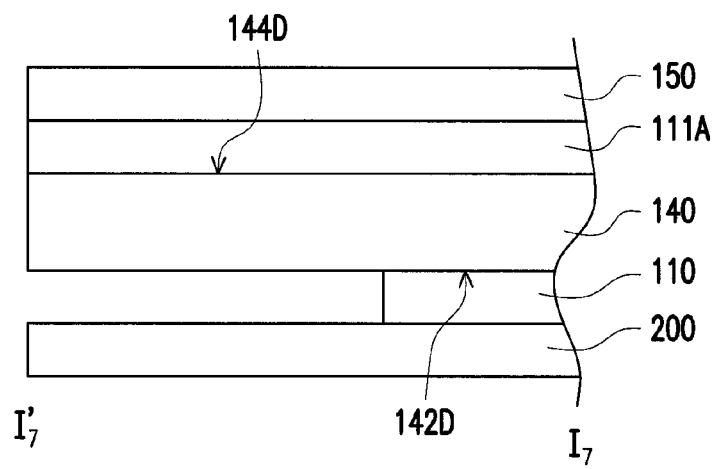
FIG. 8B is a partial cross-sectional view of the display apparatus of FIG. 8A based on a section line $I_7I_7'$.

FIG. 8A is a perspective view of a display apparatus according to another embodiment of the invention. FIG. 8B is a partial cross-sectional view of the display apparatus of FIG. 8A based on a section line $I_7I_7'$. Referring to FIG. 8A and FIG. 8B, a display apparatus 300C of the present embodiment is similar to the display apparatus 300B illustrated in FIG. 6, FIG. 7A and FIG. 7B, and the difference is that the present embodiment further having a light-transmitting medium 111A covering a second surface 144D. In detail, the light-transmitting medium 111A of the present embodiment is disposed between the protection cover plate 150 and the light guide plate 140 and covers the light guide plate 140. A refractive index of the light-transmitting medium 111A is less than the refractive index of the first light-transmitting medium 110 in the present embodiment, but the invention is not limited thereto. In other embodiments, the refractive index of the light-transmitting medium 111A may be identical to or different from the the refractive index of the first light-transmitting medium 110. Furthermore, the light-transmitting medium 110 of the present embodiment is a light-transmitting adhesive layer, but the invention is not limited thereto. In other embodiments, the light-transmitting medium 111A may further be any liquid, solid or gas light-transmitting medium suitable for covering the second surface 144D.

Figure 9A:
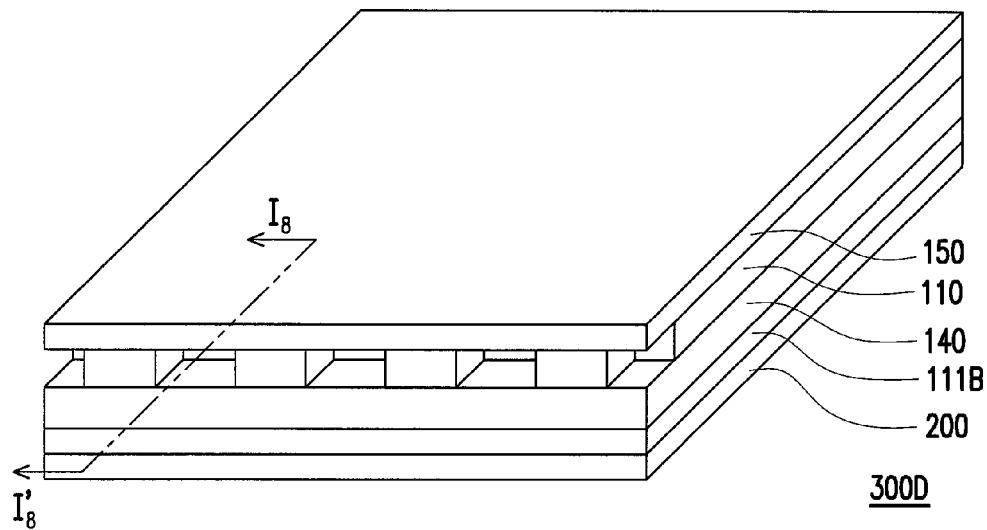
FIG. 9A is a perspective view of a display apparatus according to another embodiment of the invention.
Figure 9B:
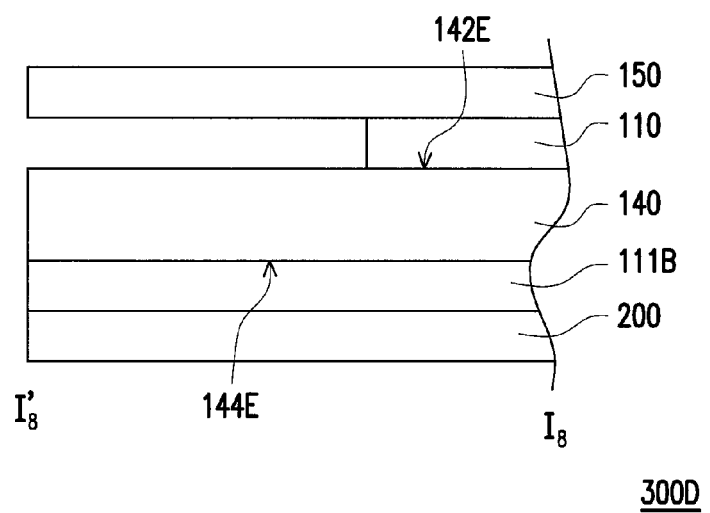
FIG. 9B is a partial cross-sectional view of the display apparatus of FIG. 9A based on a section line $I_8I_8'$.

FIG. 9A is a perspective view of a display apparatus according to another embodiment of the invention. FIG. 9B is a partial cross-sectional view of the display apparatus of FIG. 9A based on a section line $I_8I_8'$. Referring to FIG. 9A and FIG. 9B, a display apparatus 300D of the present embodiment is similar to the display apparatus 300A illustrated in FIG. 4, FIG. 5A and FIG. 5B, and the difference is that the present embodiment further has a light-transmitting medium 111B covering a second surface 144E. In detail, the light-transmitting medium 111B of the present embodiment is disposed between the protection cover plate 150 and the light guide plate 140 and covers the light guide plate 140. A refractive index of the light-transmitting medium 111B is less than the refractive index of the first light-transmitting medium 110 in the present embodiment, but the invention is not limited thereto. In other embodiments, the refractive index of the light-transmitting medium 111B may be identical to or different from the the refractive index of the first light-transmitting medium 110. Furthermore, the light-transmitting medium 111B of the present embodiment may be, for example, a light-transmitting adhesive layer, but the invention is not limited thereto, and in other embodiments, the light-transmitting medium 111B may further be any liquid, solid or gas light-transmitting medium suitable for covering the second surface 144E.

Figure 10A:
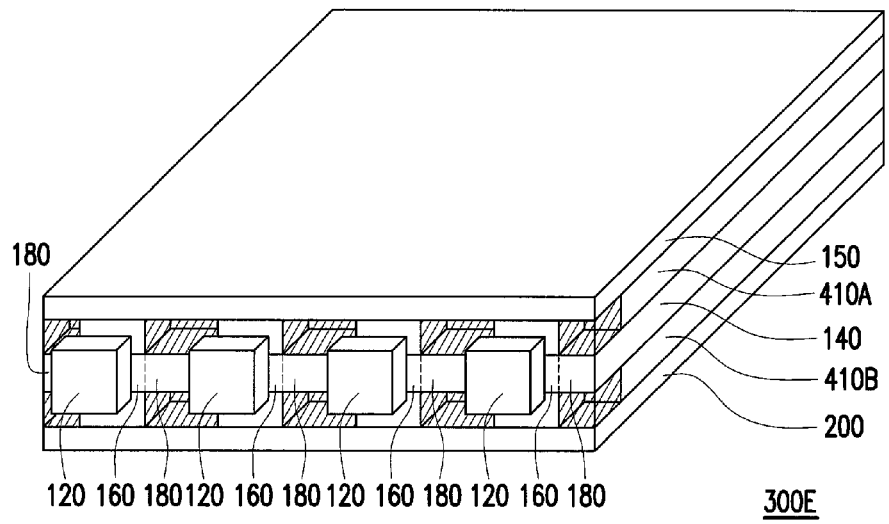
FIG. 10A is a perspective view of a display apparatus according to a second embodiment of the invention.
Figure 10B:
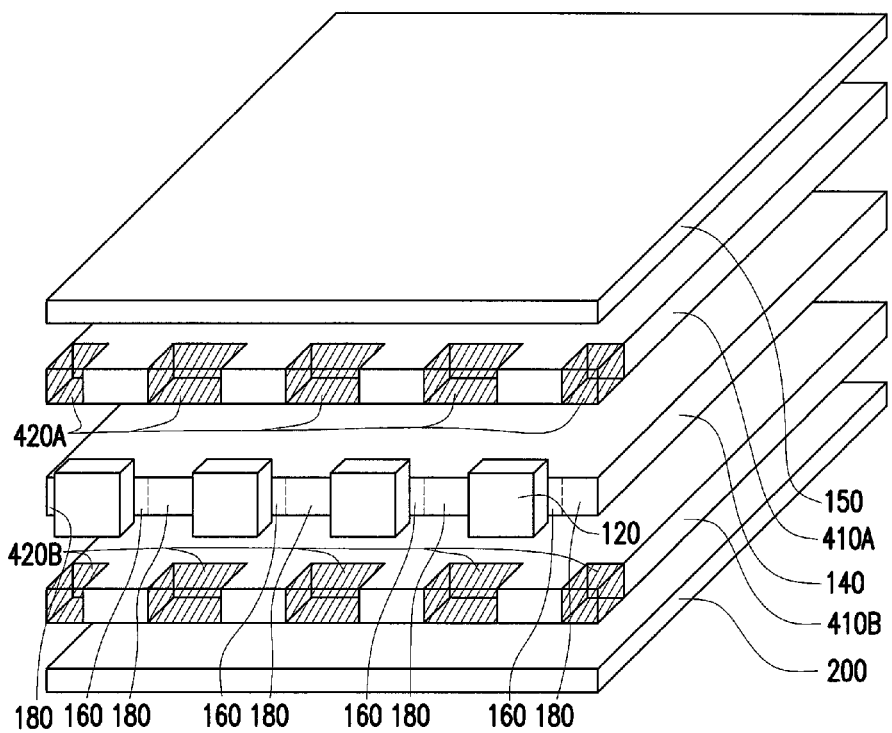
FIG. 10B is an explosive view of the display apparatus of FIG. 10A.

FIG. 10A is a perspective view of a display apparatus according to a second embodiment of the invention. FIG. 10B is an explosive view of the display apparatus of FIG. 10A. Referring to FIG. 10A and FIG. 10B, in the present embodiment, a display apparatus 300E includes a display panel 200, a light emitting device 120, a protection cover plate 150, a light guide plate 140, a first light-transmitting medium 410A, a second light-transmitting medium 420A, a third light-transmitting medium 410B and a fourth light-transmitting medium 420B. The first light-transmitting medium 410A is disposed in a region between the protection cover plate 150 and the light guide plate 140 except for a part of the region which corresponds to the second light guide ends 180, and the second light-transmitting medium 420A is disposed in the part of the region between the protection cover plate 150 and the light guide plate 140 which corresponds to the second light guide ends 180. The third light-transmitting medium 410B is disposed in a region between the display panel 200 and the light guide plate 140 except for the part of the region which corresponds to the second light guide ends 180. The fourth light-transmitting medium 420B is disposed in the part of the region between the display panel 200 and the light guide plate 140 which corresponds to the second light guide ends 180. In the present embodiment, both the first light-transmitting medium 410A and the second light-transmitting medium 420A are light-transmitting adhesive layers. A refractive index of the first light-transmitting medium 410A is greater than a refractive index of the second light-transmitting medium 420A, but the invention is not limited thereto. In other embodiments, the second light-transmitting medium may further be other gas, liquid or solid suitable for light-transmitting, which has a refractive index less than the refractive index of the first light-transmitting medium. In the present embodiment, both the third light-transmitting medium 410B and the fourth light-transmitting medium 420B are light-transmitting adhesive layers, and a refractive index of the third light-transmitting medium 410B is greater than a refractive index of the fourth light-transmitting medium 420B, but the invention is not limited thereto. In other embodiments, the fourth light-transmitting medium may further be other gas, liquid or solid suitable for light-transmitting, which has a refractive index less than the refractive index of the third light-transmitting medium. In the present embodiment, with the disposition of the light-transmitting media, the light beams are allowed to penetrate the light guide plate 140 easily before entering the active area due to the two surfaces of the light guide plate 140 which correspond to the first light guide ends 160, and the light beams are reflected by the two surfaces of the light guide plate 140 which correspond to the second light guide ends 180 easily before entering the active area. Thereby, affection from hot spots and dark spots occurring due to where the the light emitting devices 120 are located in the active area can be eliminated.

To sum up, in the embodiments of the invention, with the at least one light-transmitting medium disposed at different positions on the first surface and the second surface of the light guide plate, different positions on the same surface have different refractive indexes. Thereby, a portion of the light guide plate in front of the light emitting devices emits less light, while another portion of the light guide plate corresponding to where is between each of the light emitting devices emits more light. Thus, hot spots and dark spots on one side of the light guide plate which is adjacent to the light emitting devices are eliminated, such that the light source module can emit light uniformly. Moreover, with the light source module, the display apparatus can provide images in better quality.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A light source module, comprising:
   at least one light emitting device, adapted to emit at least one light beam;
   a light guide plate, wherein the at least one light emitting device is disposed beside the light guide plate, the light guide plate comprising:
   a first surface;
   a second surface, being opposite to the first surface; and
   a light-entering surface, connected with the first surface and the second surface;
   at least one first light guide end, located on one side of the light guide plate where the light-entering surface is located and located in front of the at least one light emitting device;
   at least one second light guide end, located on the side of the light guide plate where the light-entering surface is located and connected with the at least one first light guide end; and
   a first light-transmitting medium, disposed at the at least one first light guide end on the first surface and having a refractive index greater than a refractive index of a medium or space located at the at least one second light guide end on the first surface.

2. The light source module according to claim 1, wherein the at least one light emitting device is a plurality of light emitting devices, the at least one first light guide end is a plurality of first light guide ends, and the first light guide ends and the second light guide ends are arranged alternately along the light-entering surface.

3. The light source module according to claim 1, further comprising: a second light-transmitting medium, wherein the second light-transmitting medium is a medium located at the at least one second light guide end on the first surface and connected with the first light-transmitting medium.

4. The light source module according to claim 3, wherein the second light-transmitting medium is a light-transmitting adhesive layer.

5. The light source module according to claim 1, wherein the medium located at the at least one second light guide end on the first surface is air, gas or liquid.

6. The light source module according to claim 1, wherein the light guide plate has an active area, and the distance between an edge of the active area, which is adjacent to the light-entering surface, and the at least one light emitting device is 0 to 0.5 mm along a direction parallel to the first surface.

7. The light source module according to claim 1, further comprising:
   a protection cover plate, disposed above the first surface or the second surface.

8. The light source module according to claim 1, further comprising:
   a third light-transmitting medium, at least disposed at the at least one first light guide end on the second surface and having a refractive index greater than a refractive index of a medium or space located at the at least one second light guide end on the second surface.

9. The light source module according to claim 8, wherein the third light-transmitting medium is further disposed in a region outside the at least one first light guide end and the at least one second light guide end on the second surface.

10. The light source module according to claim 8, further comprising: a fourth light-transmitting medium, wherein the fourth light-transmitting medium is a medium located at the at least one second light guide end on the second surface and connected with the third light-transmitting medium.

11. The light source module according to claim 1, wherein the first light-transmitting medium is a light-transmitting adhesive layer.

12. The light source module according to claim 1, wherein the first light-transmitting medium is further disposed in a region outside the at least one first light guide end and the at least one second light guide end on the first surface.

13. The light source module according to claim 1, wherein the first light-transmitting medium has a refractive index less than a refractive index of the light guide plate.

14. A display apparatus, comprising:
   a display panel; and
   a light source module, disposed on the display panel and comprising:
   at least one light emitting device, adapted to emit at least one light beam; and
   a light guide plate, wherein the at least one light emitting device is disposed beside the light guide plate, the light guide plate comprising:
   a first surface;
   a second surface, being opposite to the first surface, wherein one of the first surface and the second surface faces toward the display panel, and the other of the first surface and the second surface faces the display panel with the back; and
   a light-entering surface, connected with the first surface and the second surface;
   at least one first light guide end, located on one side of the light guide plate where the light-entering surface is located and located in front of the at least one light emitting device;
   at least one second light guide end, located on the side of the light guide plate where the light-entering surface is located and connected with the at least one first light guide end; and
   a first light-transmitting medium, disposed at the at least one first light guide end on the first surface and having a refractive index larger than a refractive index of a medium or space located at the at least one second light guide end on the first surface.

15. The display apparatus according to claim 14, wherein the at least one light emitting device is a plurality of light emitting devices, the at least one light guide end is a plurality of first light guide ends, and the first light guide ends and the second light guide ends are arranged alternately along the light-entering surface.

16. The display apparatus according to claim 14, further comprising: a second light-transmitting medium, wherein the second light-transmitting medium is a medium located at the at least one second light guide end on the first surface and connected with the first light-transmitting medium.

17. The display apparatus according to claim 16, wherein the second light-transmitting medium is a light-transmitting adhesive layer.

18. The display apparatus according to claim 14, wherein the medium located at the at least one second light guide end on the first surface is air, gas or liquid.

19. The display apparatus according to claim 14, wherein the light guide plate has an active area, and the distance between an edge of the active area, which is adjacent to the light-entering surface, and the at least one light emitting device is 0 to 0.5 mm along a direction parallel to the first surface.

20. The display apparatus of claim 14, further comprising:
a protection cover plate, wherein the light guide plate is disposed between the protection cover plate and the display panel.

21. The display apparatus of claim 14, further comprising:
a third light-transmitting medium, at least disposed at the at least one first light guide end on the second surface and having a refractive index greater than a refractive index of a medium or space located at the at least one second light guide end on the second surface.

22. The display apparatus according to claim 21, wherein the third light-transmitting medium is further disposed in a region outside the at least one first light guide end and the at least one second light guide end on the second surface.

23. The display apparatus according to claim 21, further comprising: a fourth light-transmitting medium, wherein the fourth light-transmitting medium is a medium located at the at least one second light guide end on the second surface and connected with the third light-transmitting medium.

24. The display apparatus according to claim 14, wherein the first light-transmitting medium is a light-transmitting adhesive layer.

25. The display apparatus according to claim 14, wherein the first light-transmitting medium is further disposed in a region outside the at least one first light guide end and the at least one second light guide end on the first surface.

26. The display apparatus according to claim 14, wherein the display panel is a reflective display panel.

27. The light source module according to claim 14, wherein the first light-transmitting medium has a refractive index less than a refractive index of the light guide plate.

* * * * *